(12) United States Patent
Parr et al.

(10) Patent No.: US 12,304,244 B2
(45) Date of Patent: May 20, 2025

(54) NON-PNEUMATIC TIRE HAVING MOLDED SIDEWALL COVER

(71) Applicant: Bridgestone Americas Tire Operations, LLC, Nashville, TN (US)

(72) Inventors: Richard S. Parr, Canton, OH (US); Keith A. Dumigan, Kent, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 414 days.

(21) Appl. No.: 17/783,780

(22) PCT Filed: Nov. 16, 2020

(86) PCT No.: PCT/US2020/060730
§ 371 (c)(1),
(2) Date: Jun. 9, 2022

(87) PCT Pub. No.: WO2021/137956
PCT Pub. Date: Jul. 8, 2021

(65) Prior Publication Data
US 2023/0042193 A1 Feb. 9, 2023

Related U.S. Application Data

(60) Provisional application No. 62/954,742, filed on Dec. 30, 2019.

(51) Int. Cl.
*B60B 9/26* (2006.01)
*B60B 9/04* (2006.01)
(Continued)

(52) U.S. Cl.
CPC .................. *B60B 9/26* (2013.01); *B60B 9/04* (2013.01); *B60C 7/107* (2021.08); *B60C 7/146* (2021.08)

(58) Field of Classification Search
CPC .......... B60C 7/107; B60C 7/146; B60C 7/14; B60B 9/10; B60B 9/26; B60B 9/04; B60B 7/01
See application file for complete search history.

(56) References Cited

U.S. PATENT DOCUMENTS 4,945,962 A 8/1990 Pajtas
5,050,656 A 9/1991 Ho
(Continued)

FOREIGN PATENT DOCUMENTS

CN 101821116 A 9/2010
CN 101909903 A 12/2010
(Continued)

OTHER PUBLICATIONS

Supplementary European Search Report; Corresponding EP Application No. 20908617; Dec. 11, 2023.
(Continued)

*Primary Examiner* — Jason R Bellinger
(74) *Attorney, Agent, or Firm* — Shaun J. Fox; Bryan J. Jaketic (57) ABSTRACT

A non-pneumatic tire includes a lower ring having a first diameter and an upper ring having a second diameter greater than the first diameter. The upper ring is substantially coaxial with the lower ring. The non-pneumatic tire further includes support structure extending between the lower ring and the upper ring and a tread layer formed of a rubber material. The non-pneumatic tire also has a sidewall formed of the rubber material and extending seamlessly from the tread layer on a first side of the non-pneumatic tire.

18 Claims, 5 Drawing Sheets

(51) Int. Cl.
  *B60C 7/10* (2006.01)
  *B60C 7/14* (2006.01)

(56) References Cited

U.S. PATENT DOCUMENTS

| | | | |
|---|---|---|---|
| 8,567,461 B2* | 10/2013 | Williams | B29D 30/02 |
| | | | 152/30 |
| 8,770,242 B2 | 7/2014 | Deal | |
| 9,290,053 B2* | 3/2016 | Choi | B60C 7/18 |
| 9,463,603 B2* | 10/2016 | Chadwick | B29D 30/02 |
| 10,749,242 B2* | 8/2020 | Fenkanyn | H01Q 1/2241 |
| 2010/0319828 A1 | 12/2010 | Deal | |
| 2012/0038206 A1 | 2/2012 | Chadwick et al. | |
| 2016/0288571 A1 | 10/2016 | Dotson et al. | |
| 2017/0174003 A1 | 6/2017 | Benzing, II et al. | |
| 2017/0368879 A1* | 12/2017 | Lettieri | B60C 7/22 |
| 2017/0368880 A1 | 12/2017 | Haidet | |

FOREIGN PATENT DOCUMENTS

| | | |
|---|---|---|
| CN | 103338918 A | 10/2013 |
| CN | 108698345 A | 10/2018 |
| EP | 0452628 | 10/1991 |
| JP | H09-156308 | 6/1997 |
| JP | 2011500414 | 1/2011 |
| JP | 2014080151 | 5/2014 |
| KR | 10-2014-0028473 | 3/2014 |
| WO | 2004/069563 | 8/2004 |

OTHER PUBLICATIONS

International Search Report & Written Opinion; Corresponding PCT Application Serial No. PCT/US2020/060730; Authorized Officer Hwang, Chan Yoon; Feb. 22, 2021.

* cited by examiner

NON-PNEUMATIC TIRE HAVING MOLDED SIDEWALL COVER

CROSS-REFERENCE TO RELATED APPLICATIONS

This application is a national stage application, filed under 35 U.S.C. § 371, of International Patent Application No. PCT/US2020/060730, filed on Nov. 16, 2020, which in turn claims priority to U.S. Provisional Patent Application No. 62/954,742, filed on Dec. 30, 2019. Both of these documents are incorporated by reference herein in their entirety.

FIELD OF INVENTION

The present disclosure relates to a non-pneumatic tire having sidewalls. More particularly, the present disclosure relates to a non-pneumatic tire having molded sidewall covers.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects a lower ring to an upper ring.

SUMMARY OF THE INVENTION

In one embodiment, a non-pneumatic tire includes a lower ring having a first diameter and an upper ring having a second diameter greater than the first diameter. The upper ring is substantially coaxial with the lower ring. The non-pneumatic tire further includes support structure extending between the lower ring and the upper ring and a tread layer formed of a rubber material. The tread layer extends circumferentially about the entire upper ring, and further extends laterally from a first side of the non-pneumatic tire to a second side of the non-pneumatic tire. The non-pneumatic tire also includes a sidewall formed of the rubber material extending seamlessly from the tread layer to the lower ring on the first side of the non-pneumatic tire.

In another embodiment, a method of covering a side of a non-pneumatic tire is provided. The method includes providing a lower ring having a first diameter, an upper ring substantially coaxial with the lower ring, and support structure extending between the lower ring and the upper ring. The method further includes placing the lower ring, the upper ring, and the support structure in a mold and providing rubber in the mold The rubber forms a tread layer extending circumferentially about the upper ring and a sidewall layer extending from the tread layer to the lower ring on a first side of the non-pneumatic tire.

In yet another embodiment, a non-pneumatic tire having a sidewall is provided. The non-pneumatic tire includes a lower ring having a first diameter and an upper ring having a second diameter greater than the first diameter. The upper ring is substantially coaxial with the lower ring. The non-pneumatic tire further includes support structure extending between the lower ring and the upper ring and a tread layer formed of a rubber material. The non-pneumatic tire also has a sidewall formed of the rubber material and extending seamlessly from the tread layer on a first side of the non-pneumatic tire.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
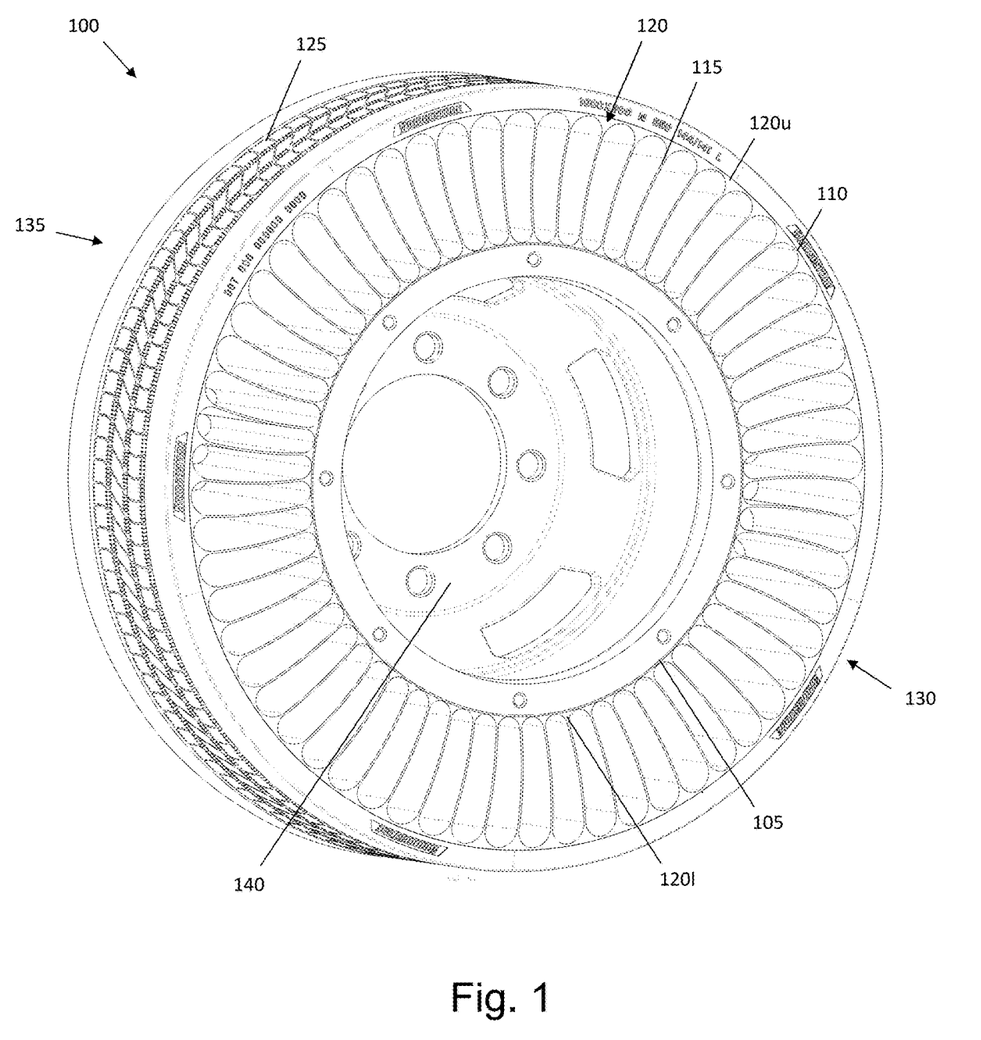
FIG. 1 is a perspective view of one embodiment of a non-pneumatic tire and rim assembly.

FIG. 1 is a perspective view of one embodiment of a non-pneumatic tire and rim assembly. The assembly includes a non-pneumatic tire 100 having a lower ring 105 with a first diameter, and an upper ring 110 having a second diameter greater than the first diameter. The upper ring 110 is substantially coaxial with the lower ring 105. A plurality of spokes 115 extend between the lower ring 105 and the upper ring 110.

A plurality of fillets 120 are disposed between the lower ring 105 and the upper ring 110 at the end of each spoke 115. The plurality of fillets 120 includes lower fillets $120_l$ and upper fillets $120_u$. The lower fillets 120l are in direct contact with the lower ring 105. The upper fillets $120_u$ are in direct contact with the upper ring 110. In an alternative embodiment, the fillets may be omitted.

In an alternative embodiment (not shown) a webbing or other support structure may be employed instead of spokes.

A circumferential tread 125 is disposed about the upper ring 110 in the illustrated embodiment. The tread 125 extends circumferentially about the entire upper ring 110, and further extends laterally from a first side 130 of the non-pneumatic tire 100 to a second side 135 of the non-pneumatic tire 100. The tread 125 may include tread elements such as grooves, ribs, blocks, lugs, sipes, studs, and other elements. A shear band or other shear element or reinforcement structure (not shown) may be disposed between the upper ring 110 and the tread 125. In an alternative embodiment (not shown), the separate tread may be omitted and instead tread elements may be formed directly on the upper ring.

The lower and upper rings 105, 110 may be constructed of a polymeric material, such as natural or synthetic rubber, other elastomeric material. Alternatively, the lower and upper rings 105, 110 may be constructed of a harder polymeric material such as polyurethane, polyester, nylon and polyvinyl chloride (PVC). The spokes 115 may be constructed of elastomeric material having a single layer of reinforcement disposed therein. The tread 125 and fillets 120 may be constructed of an elastomeric material, such as natural or synthetic rubber, other elastomeric material.

The assembly further includes a wheel 140. The lower ring 105 is attached to the rim 130, such as by an adhesive or through a chemical bonding process. The wheel 140 may be attached to a vehicle through a plurality of bolts (not shown).

Figure 2:
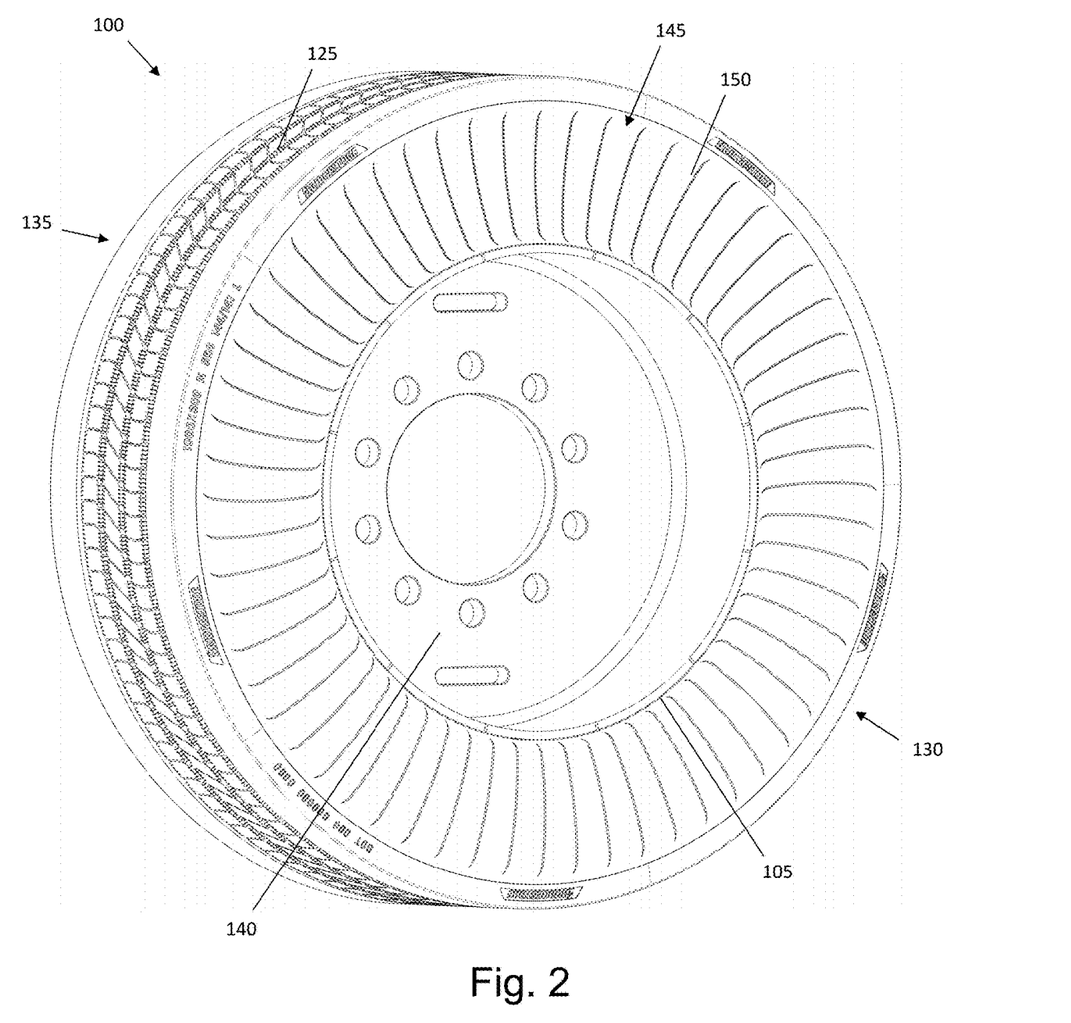
FIG. 2 is a perspective view of the non-pneumatic tire and rim assembly having one embodiment of a molded sidewall cover.
Figure 3:
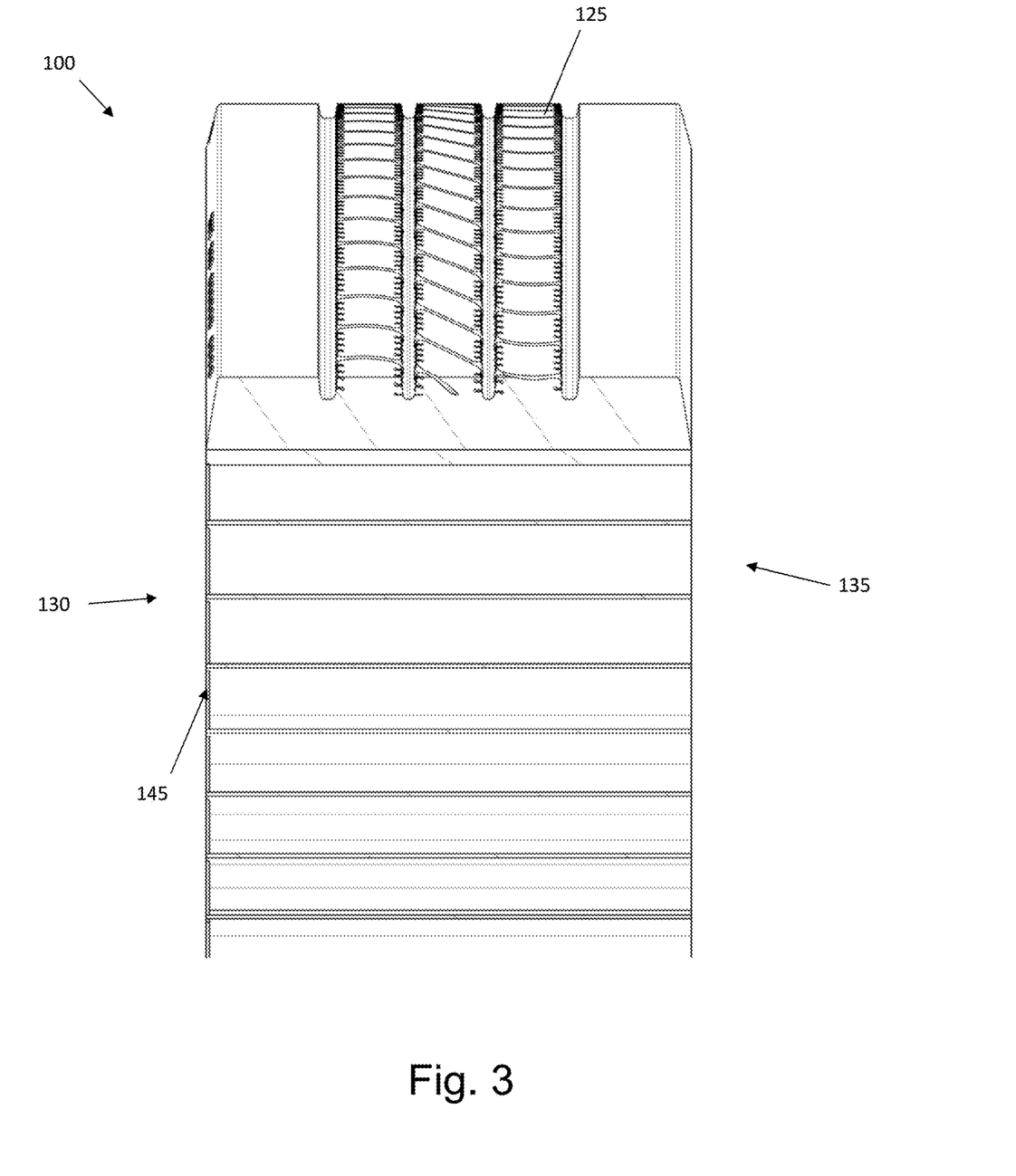
FIG. 3 is a cross-sectional view of the non-pneumatic tire and rim assembly having a molded sidewall cover as shown in FIG. 2.

FIGS. 2 and 3 provide a perspective view and a cross-sectional view, respectively, of the non-pneumatic tire and rim assembly having a molded sidewall cover 145. The molded sidewall cover 145 may also be referred to simply as a sidewall or a cover. The molded sidewall cover 145 extends from the tread 125 to the lower ring 105 on the first side 130 of the non-pneumatic tire 100. Thus, the sidewall cover 145 covers the upper ring 110, the spokes 115 and the upper and lower fillets $120_{u,l}$.

The sidewall cover 145 prevents debris from entering the openings between the spokes 115 in the non-pneumatic tire 100. Such debris could add weight to the tire and potentially damage the spokes 115 or other components. The sidewall cover 145 can also protect the tire 100 from curb damage. The sidewall cover 145 may also make the tire 100 more aerodynamic.

In one embodiment, the sidewall cover 145 is molded together with the tread 125 during the manufacturing process. Thus, as seen in FIGS. 2 and 3, the sidewall cover 145 extends seamlessly from the tread 125. In such an embodiment, the sidewall cover 145 is constructed of the same rubber material as the tread 125.

In the illustrated embodiment, a plurality of slits 150 are disposed circumferentially about the molded sidewall cover 145. In one embodiment, each slit 150 has a width less than 5 mm and a length greater than 10 mm. In more specific embodiments, each slit has a width of less than 3 mm. In yet another embodiment, each slit has a length greater than 15 mm. In still other embodiments, the width of the slits may be greater than 5 mm. Likewise, in other embodiments the length may be less than 10 mm. In the illustrated embodiment, the slits 150 all have substantially the same dimensions and extend in substantially radial directions. In an alternative embodiment, one or more of the slits may have a different length or a different width. In another alternative embodiment, one or more of the slits are disposed at an acute angle with respect to the radial direction.

In the illustrated embodiment, each slit 150 is disposed between adjacent pairs of spokes 115. In an alternative embodiment, two or more slits are disposed between adjacent pairs of spokes. In another alternative embodiment, some adjacent pairs of spokes do not have any slits disposed there between. In yet another alternative embodiment, at least one of the slits is in front of a spoke.

In other alternative embodiments, other openings may be disposed on the sidewall cover. For example, pin holes may be disposed about the sidewall cover. The openings facilitate flexing of the sidewall cover 145. Such flexing may accommodate buckling of the spokes. The openings also provide a visual indicator that the tire 100 is non-pneumatic. Due to the openings, the sidewall 145 covers between 90-95% of the first side of the non-pneumatic tire 100. In an alternative embodiment, the sidewall covers less than 90% of the first side of the non-pneumatic tire. In another alternative embodiment, the sidewall covers more than 95% of the first side of the non-pneumatic tire. For example, in one alternative embodiment, the sidewall does not have any openings at all, but is instead a solid sidewall.

In one embodiment, the sidewall cover 145 may have reinforcements embedded therein. For example, a mesh or cords of reinforcing material may be embedded in the sidewall cover. Exemplary reinforcing materials include nylon, polyester, aramid, glass, or carbon fibers. Alternatively, metal reinforcements may be employed.

Figure 4:
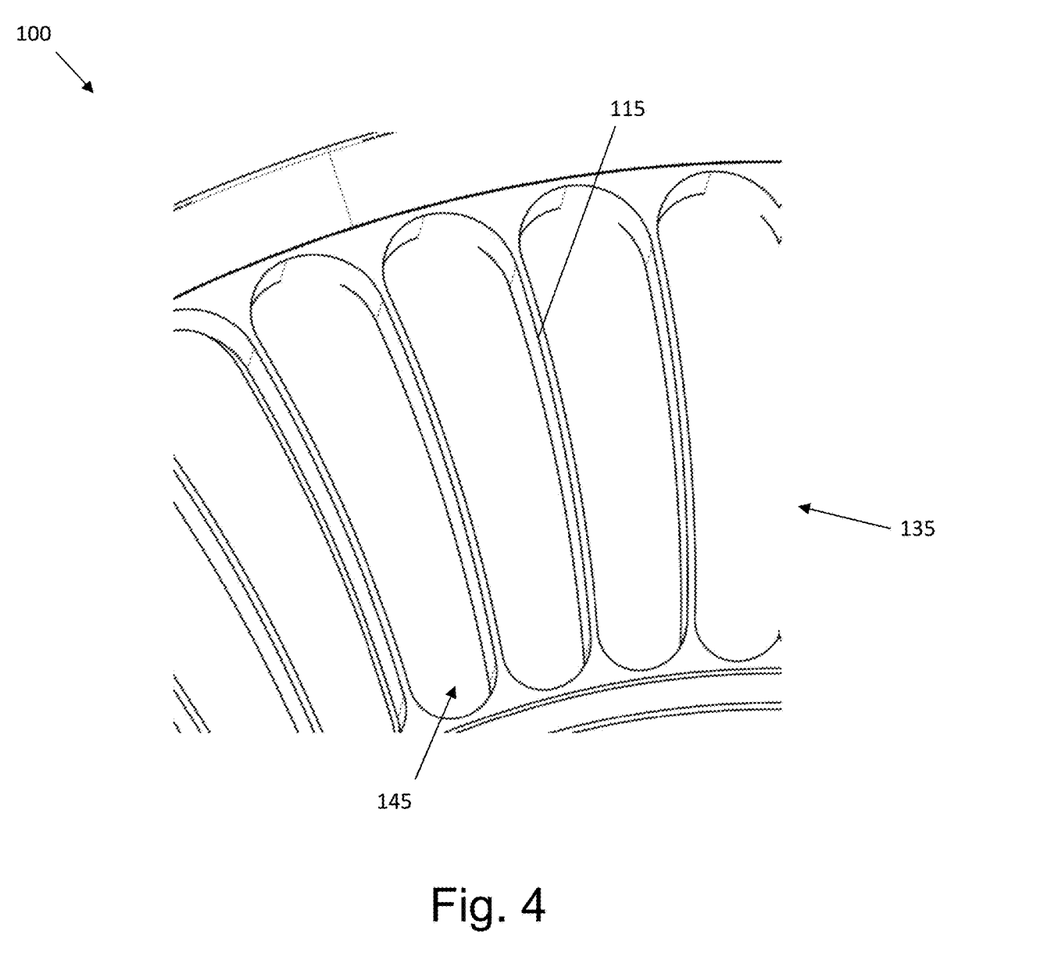
FIG. 4 is a detail of a rear perspective view of the non-pneumatic tire and rim assembly having a molded sidewall cover.

FIG. 4 is a detail of a rear perspective view of the non-pneumatic tire and rim assembly having a molded sidewall cover. As can be seen from this view, the second side 135 of the non-pneumatic tire 100 does not have a sidewall cover. In an alternative embodiment, a second sidewall cover formed of the rubber material extends seamlessly from the tread layer on the second side of the non-pneumatic tire to the lower ring. The second sidewall cover may be substantially the same as the sidewall cover 145, or may incorporate any of the alternative features detailed above.

In one embodiment, the tread 125 and the sidewall cover 145 are made through a compression molding process. In one such embodiment, an operator provides the lower ring 105, the upper ring 110, and the spokes 115. The operator arranges the lower ring 105 inside of the upper ring 110, and arranges the spokes 115 such that they extend between the lower ring 105 and the upper ring 110. The operator places the lower ring 105, the upper ring 110, and the spokes 115 in a compression mold. In one embodiment, the compression mold includes a plurality of shutoffs disposed on a first side of the compression mold. For example, the compression mold may include a core and a cavity, and the shutoffs may be disposed on the core, while the cavity includes a flat plate. Alternatively, the compression mold may include a core and a cavity with the shutoffs disposed on the cavity, while the core includes a flat plate. In all cases, the spokes may arranged such that one or more shutoffs are disposed between adjacent pairs of spokes.

The operator then provides rubber in the compression mold. The rubber is heated such that it flows throughout the mold and forms the tread 125 and the sidewall cover 145. The rubber will flow around any shutoffs that are present, such it forms a plurality of openings in the sidewall cover 145.

In one embodiment, the operator places a reinforcement layer in the compression mold prior to placing the lower ring 105, the upper ring 110, and the spokes 115 in the compression mold, and prior to the providing of rubber in the compression mold. The reinforcement layer may be one of the reinforcement layers described above. The reinforcement layer extends between the lower ring 105 and the upper ring 110. Additionally, or in the alternative, a reinforcement layer may also be placed circumferentially about the upper ring 110 prior to providing rubber in the compression mold.

In an alternative embodiment, the upper and lower rings, the support structure, the tread, and the sidewall are all formed in a mold during the same molding process. In such an embodiment, the upper and lower rings, the support structure, the tread, and the sidewall may be formed of the same material. Alternatively, different materials may be added to the mold at different times to form different structures.

In an alternative embodiment, the tread and sidewall cover are made through an injection molding process. In another alternative embodiment, the tread and sidewall cover are formed separately, and cured together in another heating process, such as with an autoclave.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

Figure 5:
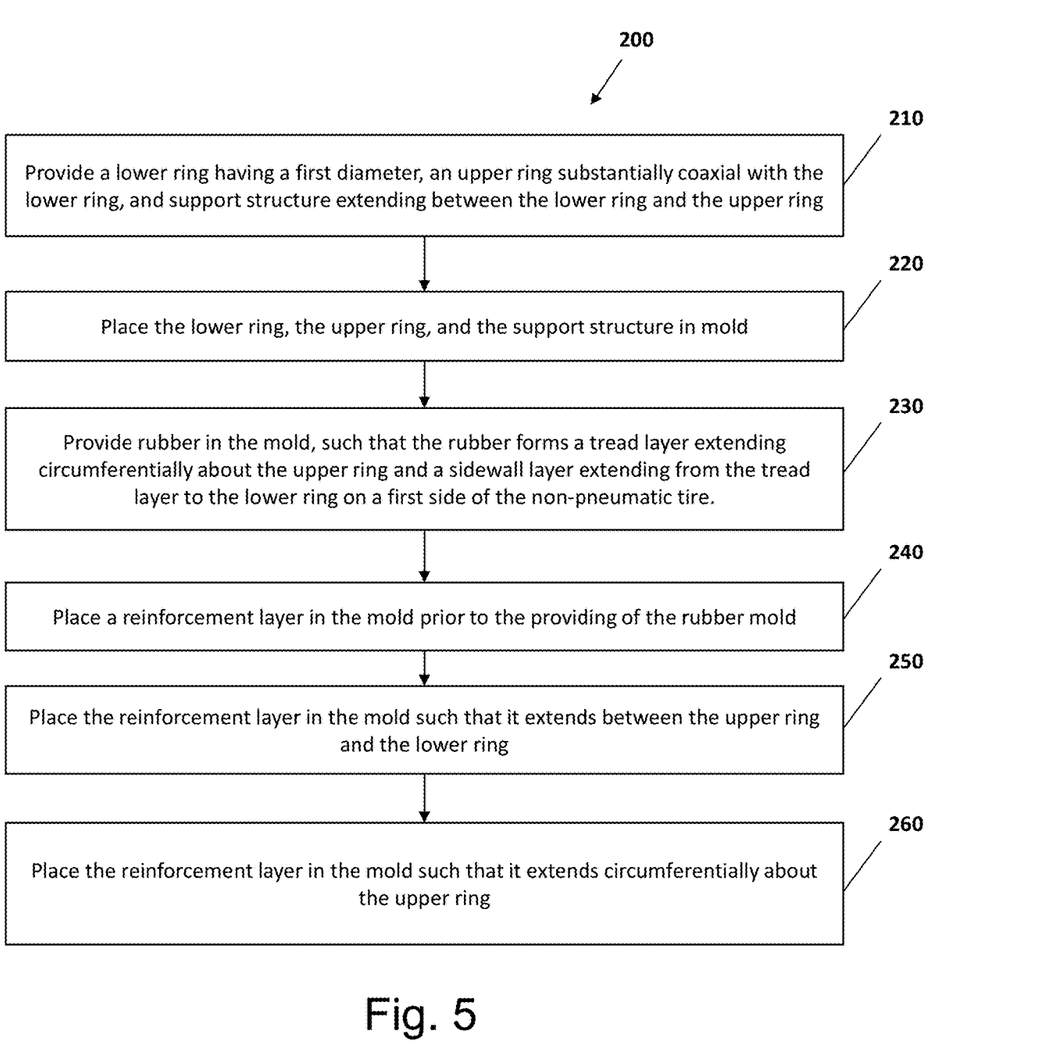
FIG. 5 is a flow chart showing one embodiment of a method of covering a side of a non-pneumatic tire.

FIG. 5 is a flowchart showing one embodiment of a method 200 of covering a side of a non-pneumatic tire. The method includes providing a lower ring having a first diameter, an upper ring substantially coaxial with the lower ring, and support structure extending between the lower ring and the upper ring (step 210). The method further includes placing the lower ring, the upper ring, and the support structure in mold (step 220). The method further includes providing rubber in the mold, such that the rubber forms a tread layer extending circumferentially about the upper ring and a sidewall layer extending from the tread layer to the lower ring on a first side of the non-pneumatic tire (step 230). The method further includes placing a reinforcement layer in the mold prior to the providing of the rubber mold (step 240). The method further includes placing the reinforcement layer in the mold such that it extends between the upper ring and the lower ring (step 250). The method further includes placing the reinforcement layer in the mold such that it extends circumferentially about the upper ring (step 260).

What is claimed is:

1. A non-pneumatic tire comprising:
a lower ring having a first diameter;
an upper ring having a second diameter greater than the first diameter, the upper ring being substantially coaxial with the lower ring; and
a support structure extending between the lower ring and the upper ring;
a tread layer formed of a rubber material,
wherein the tread layer extends circumferentially about the entire upper ring, and
wherein the tread layer extends laterally from a first side of the non-pneumatic tire to a second side of the non-pneumatic tire; and
a sidewall formed of the rubber material extending seamlessly from the tread layer to the lower ring on the first side of the non-pneumatic tire,
wherein the sidewall includes a plurality of radially extending slits, each slit having a width less than 5 mm and a length greater than 10 mm.

2. The non-pneumatic tire of claim 1, wherein the sidewall covers between 90-95% of the first side of the non-pneumatic tire.

3. The non-pneumatic tire of claim 2, wherein the support structure includes a plurality of spokes, and wherein each of the plurality of openings in the sidewall are disposed between adjacent pairs of the plurality of spokes.

4. The non-pneumatic tire of claim 1, further comprising a second sidewall formed of the rubber material extending seamlessly from the tread layer to the lower ring on the second side of the non-pneumatic tire.

5. The non-pneumatic tire of claim 1, wherein the support structure includes a plurality of spokes.

6. A method of covering a side of a non-pneumatic tire, the method comprising:
providing a lower ring having a first diameter, an upper ring substantially coaxial with the lower ring, and a support structure extending between the lower ring and the upper ring;
placing the lower ring, the upper ring, and the support structure in a mold; and providing rubber in the mold, such that the rubber forms a tread layer extending circumferentially about the upper ring and a sidewall layer extending from the tread layer to the lower ring on a first side of the non-pneumatic tire; and forming a plurality of radially extending slits in the sidewall layer, each slit having a width less than 5 mm and a length greater than 10 mm.

7. The method of claim 6, further comprising placing a reinforcement layer in the mold prior to the providing of the rubber in the mold.

8. The method of claim 7, wherein the reinforcement layer is placed in the mold such that the reinforcement layer extends between the upper ring and the lower ring.

9. The method of claim 7, wherein the reinforcement layer is placed in the mold such that the reinforcement layer extends circumferentially about the upper ring.

10. The method of claim 6, wherein the support structure includes a plurality of spokes.

11. A non-pneumatic tire having a sidewall, the non-pneumatic tire comprising:
a lower ring having a first diameter;
an upper ring having a second diameter greater than the first diameter, the upper ring being substantially coaxial with the lower ring;
a support structure extending between the lower ring and the upper ring;
a tread layer formed of a rubber material; and
a sidewall formed of the rubber material and extending seamlessly from the tread layer on a first side of the non-pneumatic tire;
wherein the sidewall includes a plurality of radially extending slits, each slit having a width less than 5 mm and a length greater than 10 mm.

12. The non-pneumatic tire of claim 11, wherein a second side of the non-pneumatic tire does not have a sidewall.

13. The non-pneumatic tire of claim 11, wherein the tread layer has a plurality of circumferential grooves disposed therein.

14. The non-pneumatic tire of claim 11, wherein the tread layer and the sidewall are formed together through a molding process.

15. The method of claim 6, wherein the sidewall layer covers between 90-95% of the first side of the non-pneumatic tire.

16. The method of claim 6, wherein a second side of the non-pneumatic tire does not have a sidewall.

17. The non-pneumatic tire of claim 11, wherein the sidewall layer covers between 90-95% of the first side of the non-pneumatic tire.

18. The non-pneumatic tire of claim 11, wherein the support structure includes a plurality of spokes.

* * * * *